(12) United States Patent
van de Laar

(10) Patent No.: US 8,204,210 B2
(45) Date of Patent: Jun. 19, 2012

(54) METHOD AND SYSTEM FOR NONLINEAR ACOUSTIC ECHO CANCELLATION IN HANDS-FREE TELECOMMUNICATION DEVICES

(75) Inventor: Jakob van de Laar, Best (NL)

(73) Assignee: NXP B.V., Eindhoven (NL)

( * ) Notice: Subject to any disclaimer, the term of this patent is extended or adjusted under 35 U.S.C. 154(b) by 47 days.

(21) Appl. No.: 12/702,761

(22) Filed: Feb. 9, 2010

(65) Prior Publication Data
US 2011/0194685 A1    Aug. 11, 2011

(51) Int. Cl.
*H04M 9/08*    (2006.01)

(52) U.S. Cl. .................. 379/406.1; 379/406.12; 381/59; 381/96

(58) Field of Classification Search . 379/406.01–406.16
See application file for complete search history.

(56) References Cited

U.S. PATENT DOCUMENTS

| 5,542,001 | A | | 7/1996 | Reiffin |
| 5,680,450 | A | * | 10/1997 | Dent et al. ............... 379/406.08 |
| 6,546,099 | B2 | | 4/2003 | Janse |
| 2006/0133620 | A1 | * | 6/2006 | Lashkari ........................ 381/59 |
| 2007/0019803 | A1 | | 1/2007 | Merks et al. |

FOREIGN PATENT DOCUMENTS

WO    2003010950 a1    2/2003

OTHER PUBLICATIONS

Ngia K. S. H. et al. "Nonlinear acoustic echo cancellation using Hammerstein model", Acoustics, Speech and Signal Processing, 1998 Proceedings of the 1998 IEEE International Conference, IEEE, US, vol. 2, pp. 1229-1232, May 12, 1998.

A. Stenger, L. Trautmann, and R. Rabenstein, "Nonlinear Acoustic Echo Cancellation with 2nd Order Adaptive Volterra Filters," in Proc. ICASSP, Phoenix (USA), May 1999, vol. II, pp. 877-880.

A. Stenger and R. Rabenstein, "Adaptive Volterra Filters for Non-Linear Acoustic Echo Cancellation," in Proc. NSIP, Antalya (Turkey), Jun. 1999.

A. Stenger, W. Kellermann, and R. Rabenstein, "Adaptation of Acoustic Echo Cancellers Incorporating a Memoryless Nonlinearity," in IEEE Workshop on Acoustic Echo and Noise Control (IWAENC), Pocono Manor, PA, USA, Sep. 1999.

A. Stenger, W. Kellermann, "RLS-Adapted Polynomial for Nonlinear Acoustic Echo Cancelling," in Proc. EUSIPCO, Tampere (Finland), Sep. 2000, pp. 1867-1870.

A. Stenger and W. Kellermann, "Adaptation of a Memoryless Preprocessor for Nonlinear Acoustic Echo Cancelling," Signal Processing, vol. 80, pp. 1747-1760, 2000.

Andrew Bright, Active control of loudspeakers: an investigation of practical applications, Ph.D. thesis, Technical University of Denmark, 2002.

Extended European Search Report, EPO, Oct. 28, 2011.

* cited by examiner

*Primary Examiner* — Fan Tsang
*Assistant Examiner* — Ibraham Sharifzada

(57) ABSTRACT

A method and system for determining and compensating for a non-linearity in a hands-free acoustic telecommunication device is disclosed. The method determines a back electromotive force signal induced in a loudspeaker from at least one of a coil voltage, a current signal and estimates of coil resistance and inductance, estimating at least one of a cone position and a cone velocity from the BEMF integrated with respect to time and determining an estimate of an echo value from a series connection of an estimated inverse of a force factor function primitive and the estimated acoustic impulse response; and outputting the estimated echo value.

9 Claims, 15 Drawing Sheets

METHOD AND SYSTEM FOR NONLINEAR ACOUSTIC ECHO CANCELLATION IN HANDS-FREE TELECOMMUNICATION DEVICES

This invention relates to the field of echo cancellation and more particularly to the design of a Nonlinear Acoustic Echo Canceller (NL-AEC).

The demand for high-quality full-duplex hands-free telecommunication systems to be used in devices such as mobile phones, car kits, PDA's, etcetera, is still growing rapidly. System manufacturers and network operators consider the audio quality of such systems to be of utmost importance for consumer acceptance and satisfaction. A very important problem involved in hands-free acoustic telecommunication systems concerns the elimination of acoustic echoes while maintaining full-duplex operation. In particular, a hands-free acoustic communication scenario usually requires such large sound pressure levels that the loudspeaker of the near-end device is driven into its nonlinear range, thereby contributing nonlinearly distorted echo components to the near-end microphone signal. Since hands-free (mobile) devices available on the consumer electronics market usually possess cheap and non-ideal loudspeakers, and employ linear adaptive filters in their Acoustic Echo Cancellers, they cannot estimate and suppress such components correctly.

Hence, there is a need for a Nonlinear Acoustic Echo Canceller in hands-free devices that is able to reduce nonlinear echo components caused by loudspeaker nonlinearities.

A method and system for determining and compensating for nonlinear acoustic echo components caused by loudspeaker nonlinearities is disclosed. The method employs the Back Electro-Motive Force (BEMF) signal induced in the loudspeaker coil due to its movement in a static magnetic field to estimate the position and/or velocity of the coil, and compensates for the associated nonlinear echo components in the microphone signal.

In accordance with the principles of the invention, the loudspeaker 157 (FIG. 2) is modeled as a Hammerstein system, i.e., a memory-less function, followed by a linear filter. This can only be done because the Back EMF (BEMF) is used as the input signal, which is very natural and intuitive because in a sense the conversion from the electrical to the mechanical-acoustical domain always passes by means of the BEMF. A Hammerstein system is much easier to identify than a more general nonlinear system with memory.

The systems and methods described herein may be understood by reference to the following figures.

Figure 1:
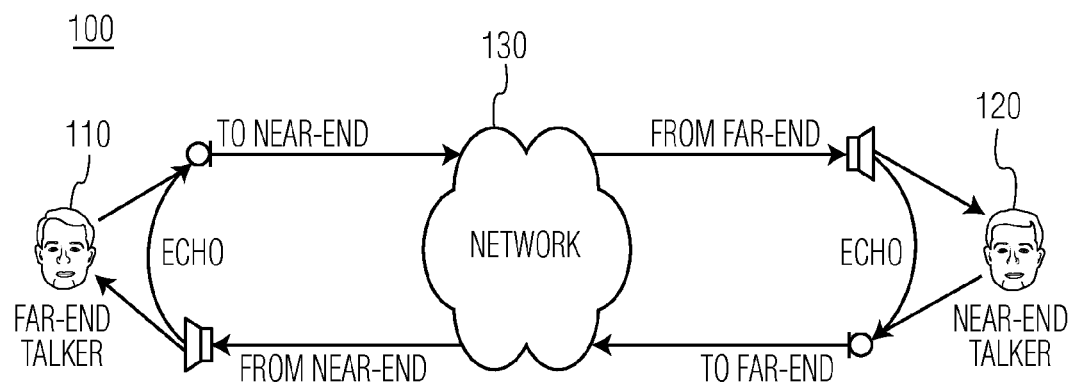
FIG. 1 illustrates the problem of acoustic echoes in a conventional hands-free telecommunication system.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

Prior to providing a detailed description of the invention recited in the appended claims, the following nomenclature is provided for reference:

Microphone pressure: $p(t)$;
Voltage on terminals of loudspeaker coil: $v(t)$;
Electrical current trough loudspeaker coil: $i(t)$;
Back EMF induced in loudspeaker coil: $u(t)$;
Integral of Back EMF: $w(t)$;
Electrical resistance of loudspeaker coil: $R$;
Electrical inductance of loudspeaker coil: $L$;
Loudspeaker cone position: $x(t)$;
Loudspeaker cone velocity: $\dot{x}(t) \triangleq dx(t)/dt$;
Loudspeaker cone acceleration: $\ddot{x}(t) \triangleq d^2x(t)/dt^2$
Lorentz force on moving part of loudspeaker: $f(t)$;
Mass of moving part of loudspeaker: $m$;
Damping factor of moving part of loudspeaker: $c$;
Stiffness or spring factor of moving part of loudspeaker: $k$; and
Memory-less non-uniform force factor function: $\phi(.)$.

The demand for high-quality (mobile) full-duplex hands-free telecommunication systems such as mobile phones, car kits, audio and video teleconferencing systems, hands-free voice recognition devices, PDA's, etcetera, is growing rapidly. System manufacturers still consider the audio quality of such systems to be of utmost importance for consumer acceptance and satisfaction. The same holds for network operators, which gain higher revenues because conversations last longer when listening fatigue is reduced. A very important problem involved in hands-free acoustic telecommunication systems concerns the elimination of acoustic echoes while maintaining full-duplex operation.

Prior to describing the invention claimed a general setup of a full-duplex acoustic telecommunication system is described, and then the acoustic echo cancellation problem is discussed. See FIGS. 1 and 2, respectively. With respect to FIG. 1, a telecommunication system 100 includes a network 130 that allows at least two people or devices to communicate with each other. In this illustrated case, a far-end talker 110 may send audio data, for example, to a near-end talker 120 via network 130 and near-end talker 120 may transmit audio data, for example, to the far-end talker 110 via network 130.

Figure 2:
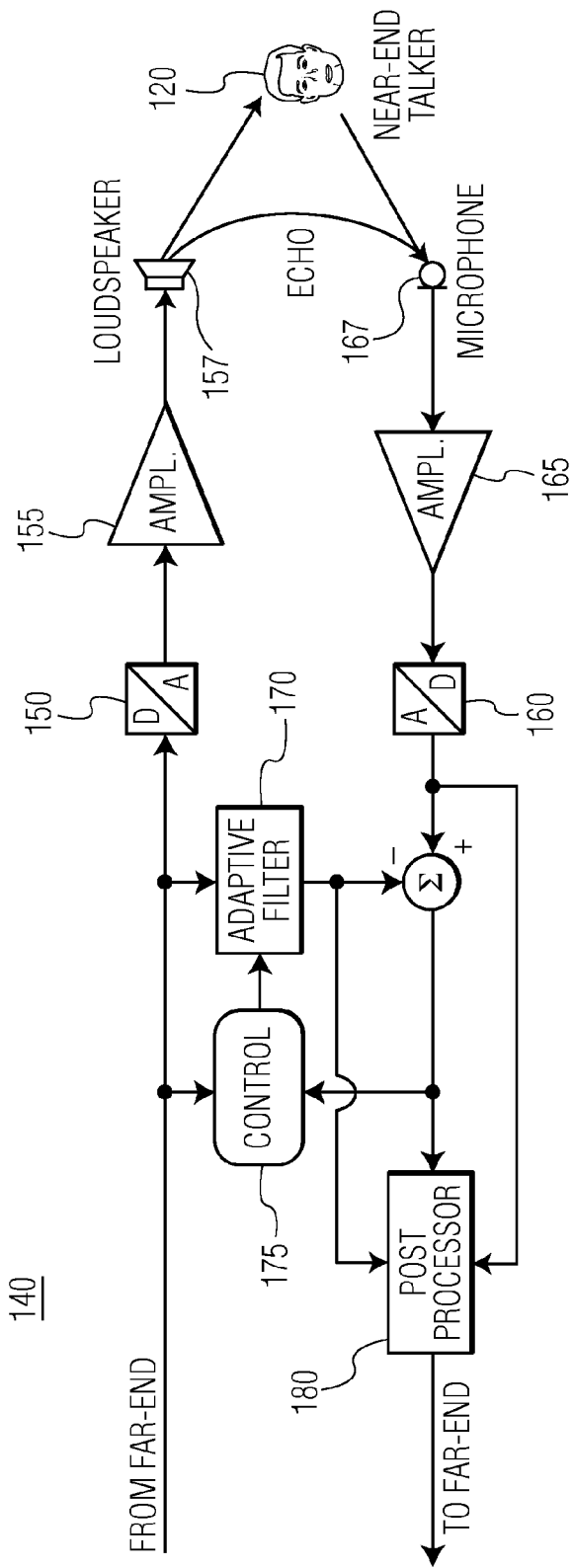
FIG. 2 illustrates a block diagram of a receiving system in a conventional echo cancelling system.

More specifically, an acoustic telecommunication device 140 associated with a corresponding user 120 receives signals from and transmits signals to another device (not shown) via a network or communication link 130. At each side, the signal received from the other side is processed (after demodulation to a baseband digital signal), converted from a digital into an analogue signal by a D/A-converter 150, amplified by amplifier 155, and then reproduced by a loudspeaker 157 (see FIG. 2). At the same time, at each side the local acoustic signal is recorded by a microphone 167, amplified by amplifier 165, converted from an analogue into a digital signal by an A/D-converter 160, processed, and then transmitted to the other side (after proper modulation) (FIG. 2).

Hence, in each terminal 140 both the recorded and received digital signals are used for processing. As is clear from the figures, if the far-end side also operates in hands-free mode, the problem setup in principle is symmetric.

Since the loudspeaker 157 emits the far-end signal into the environment around the near-end communication device, in addition to the desired effect that the near-end user 120 can hear the far-end user 110 signal, there is the undesired effect that the loudspeaker signal also propagates to the microphone 167. Hence, in addition to the desired near-end speech signal, the signal recorded by the microphone contains the far-end signal filtered by the near-end acoustic path. If the unprocessed microphone signal would be sent to the far-end side, the far-end user would also hear his own voice again, i.e., an echo, would be present. In the case of a strong acoustic coupling between far-end loudspeaker and microphone, a repetition of this process would result in 'howling' of the signals.

The purpose of acoustic echo cancellation is to remove the echo produced at the near-end side while retaining the near-end speech signal, thereby allowing full-duplex communication and avoiding howling, as opposed to half-duplex communication where only one participant at a time can talk. It should be noted that the most relevant aspect of full-duplex speech communication is that a near-end speaker can interrupt an active far-end speaker. During the brief interval of so-called double talk when both participants speak, it is of less importance that the near-end signals remain undistorted. The basic idea of an acoustic echo canceller is to estimate the far-end echo component in the near-end microphone signal using both the far-end and the microphone signals. This echo estimate is then subtracted from the microphone signal, ideally yielding a signal that only contains the near-end signal. The cleaned microphone signal is then transmitted to the far-end side, possibly after other processing such as noise suppression.

In the hands-free mode, there is a large distance between the user and the device compared to the hand-set mode. In order to enable the user to clearly hear the far-end signal, the loudspeaker has to produce a large sound pressure level. Combined with the fact that in portable devices the loudspeaker and microphone are usually spaced quite closely, this results in a very strong echo signal compared to the near-end signal. In typical scenarios, the echo to near-end signal ratio can range from 10 till 25 dB. In addition, because of the large sound pressure level to be produced by the loudspeaker, several (cheap) parts of the transducer chain operate in their nonlinear range. For example, this holds for the amplifier and loudspeaker. Another kind of nonlinearity is caused by mechanical vibrations of the phone housing. All these causes result in nonlinearly distorted echo components in the microphone signal. Since most mobiles and other acoustic telecommunication devices available on the market employ a linear AEC, possibly followed by a post-processor, they cannot deal properly with nonlinearly distorted echoes. However, this is very important because more and more quality is demanded. In principle, when only the voltage is used as input signal, the loudspeaker behaves as a nonlinear system with memory. Such systems are usually modelled by nonlinear filters with memory, such as Volterra filters (see references 1 and 2) neural networks, Nonlinear Autoregressive Moving Average (NARMA) models, etc, which require many coefficients and are difficult to adapt.

A state of the art AEC usually consists of two main parts (see references 3-5 and FIG. 2).

The first is a linear adaptive filter 170 (usually in the form of a Finite-Impulse-Response filter), which adaptively models the total electro-mechanic-acoustical impulse response from the far-end signal to the microphone signal, i.e. among other things it should include the amplifier and loudspeaker characteristics, and the Acoustic Impulse Response (AIR) from the loudspeaker to the microphone. The adaptive filter may be a (Normalized) Least Mean Squares (LMS), Recursive Least Squares (RLS), or Affine Projection (AP) algorithm, or any other algorithm known from the literature (see, for example, reference 6).

In practice, any adaptive filter can only partially remove the echo for several reasons. Firstly, as we have shown above, this is due to the various nonlinearities. Secondly, because the adaptive filter length is limited by complexity and memory restrictions, it has too few coefficients to properly model all the dynamics, i.e., the system is under-modeled. Finally, the acoustics around the terminal 140 may change due to movements, temperature changes, and so on, thereby causing tracking difficulties for the adaptive filter.

For those reasons, AEC's often have a second part consisting of a spectral post-processor 180 (see reference 3). Ideally, echo components not removed by the adaptive filter 170 are suppressed in the post-processor 180, which can be seen as a time and frequency dependent gain function that selectively attenuates those frequency bins in which significant far-end echo is still present. Detailed information regarding the functioning of the post-processor can be found in references 3 and 4, for example.

Although post-processing can remove residual echoes to a certain extent, it also introduces distortion during double talk, especially during bad signal-to-echo ratios and with nonlinear distortion, thereby harming the full-duplex functionality.

Although a post-processor 180 is very useful and robust, only very crude measures are taken to suppress nonlinear echo parts (see reference 7), which harm the full-duplex capability. The best way for echo suppression is to correctly estimate the (nonlinear) echo, and leaving as little as possible to be done by the post-processor, because this way the full-duplex functionality can be maintained.

In the hands-free scenario, an adaptive nonlinear scheme is required to achieve adequate echo cancellation. In state of the art AEC systems, which only use the voltage as input signal, the loudspeaker 157 needs to be considered as a nonlinear system with memory. Such systems are usually modeled with Volterra filters, neural networks, or NARMA models, which all require many coefficients and are difficult to adapt (see references 1 and 2).

Figure 3:
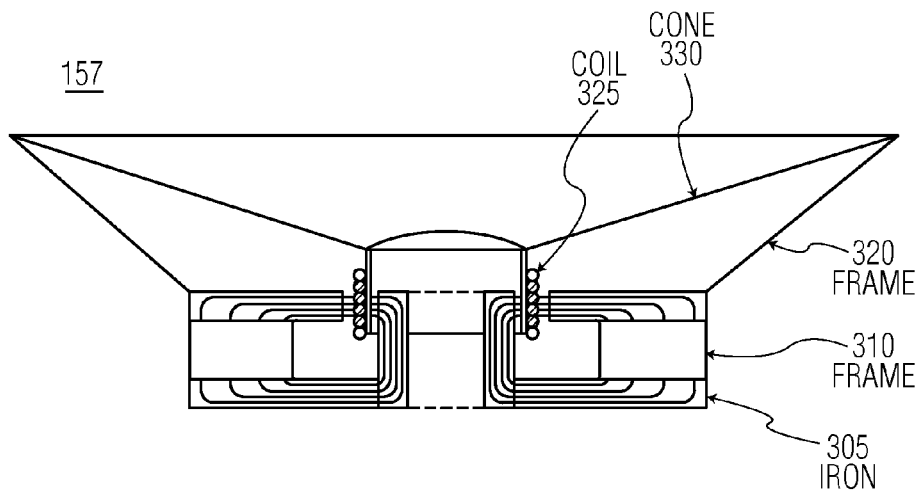
FIG. 3 illustrates a schematic diagram of the basic components of an electrodynamic loudspeaker.

In accordance with the principles of the invention, the loudspeaker 157 is modeled as a Hammerstein system with the BEMF as its input signal, i.e., it is represented by a memory-less function followed by a linear filter. Since a Hammerstein system is much easier to identify than a more general nonlinear system with memory, this is a major advantage compared to state of the art methods for NL-AEC. The memory-less function modeled is the force factor function, $\phi$ (.), which is a function of the cone position, x(t). It is the non-uniformess of the force factor function that causes the most important nonlinearity in the electrical part of the loudspeaker (model). This function represents the ratio of the Lorentz force f(t) to the electrical current i(t), i.e. the product $$f(t) = \phi(x(t))i(t)$$

is the Lorentz force exerted on the moving part of the loudspeaker 157 that is generated by the electrical current i(t) flowing through the loudspeaker coil 325 in the magnetic field, which is maintained by a fixed permanent magnet 310 in the magnetic gap of the loudspeaker 157. FIG. 3 illustrates the components of a basic loudspeaker 157 comprising an iron core 305, magnet 310, a frame 320, a coil 325 and a cone 330.

Figure 4:
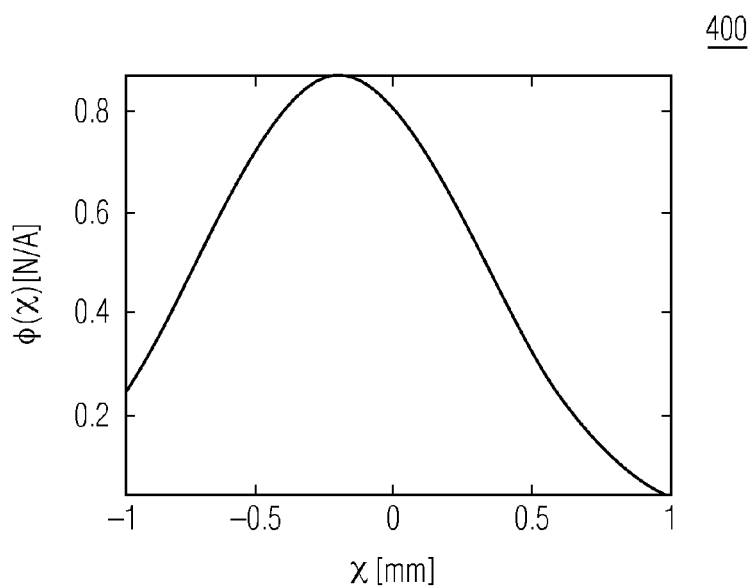
FIG. 4 illustrates a graph of an exemplary force factor function.

Since the total magnetic flux through the coil 325 is a function of the coil position x(t) at time t, $\phi$ (x(t)) is a function of the cone position x(t). As an example, consider the loudspeaker construction in FIG. 3. If the coil is located as far as possible away from the magnet, less magnetic flux flows through the coil and thus the force factor is smaller than in the middle position. The same holds when the coil is located as close as possible to the magnet. These effects are illustrated in FIG. 4.

Figure 5:
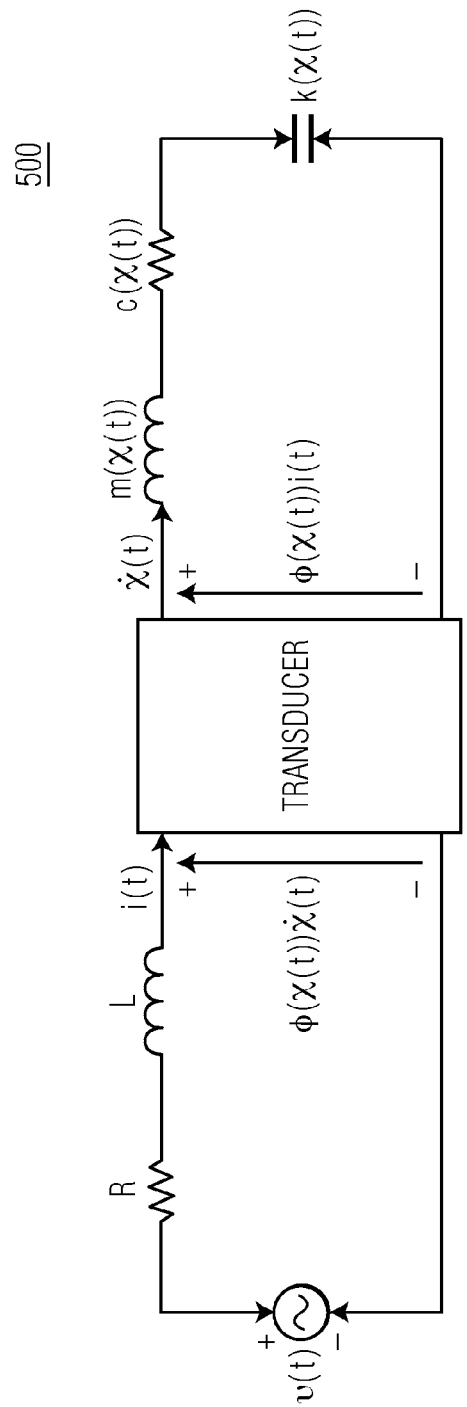
FIG. 5 illustrates a schematic diagram of an electro-mechanical loudspeaker model.
Figure 6:
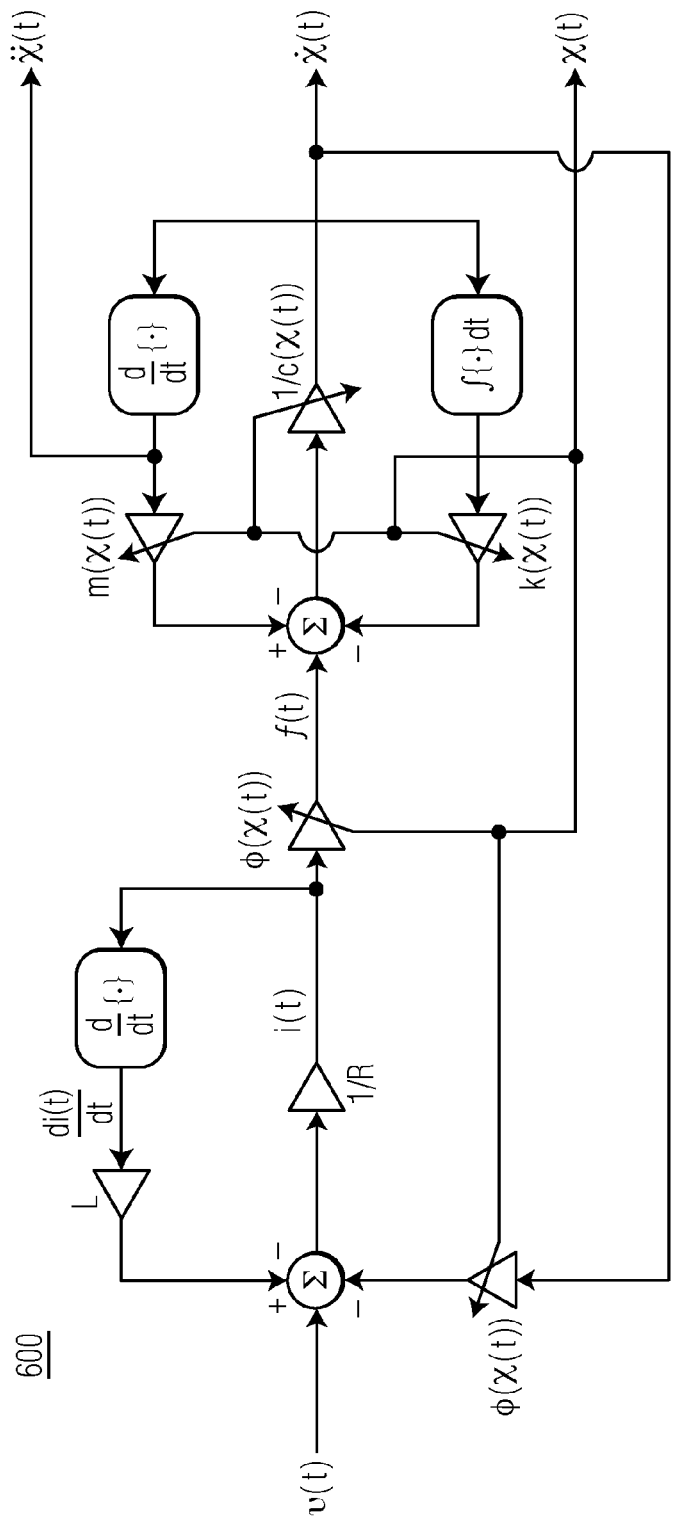
FIG. 6 illustrates a functional block diagram model of an electro-mechanical loudspeaker model.

Because $\phi$ (x(t)) is a function of the cone position x(t) at time t, i.e., it is non-uniform or non-constant, the electrical part of the loudspeaker model is nonlinear. This implies that the transfer from the coil voltage to the cone velocity or position, and thus the (measured) microphone pressure, is nonlinear. In the sequel, we assume that the electrical resistance and inductance are independent of the cone position. The most dominant nonlinearities in the mechanics of the loudspeaker concern the cone suspension system and can be represented as the dependence of the mass, and damping and spring factors on the cone position. FIGS. 5 and 6 illustrate a schematic diagram and a block diagram, respectively, of electro-mechanical loudspeakers. These models are well-known in the art and need not be discussed in detail herein.

These effects of nonlinearly distorted echo components (or signal feedback through the microphone) are most pronounced for small loudspeakers that are used for example in mobile communication devices and PDAs, and other similar type devices. As we have mentioned before, since our approach can deal with arbitrary mechanical nonlinearities, these nonlinearities do not have be modeled, as opposed to the state of the art methods. Finally, the amplifier saturation nonlinearity has already been coped with in the prior art (see references 8-13). The echo cancellation performance in mobile devices may be limited by the non-linear distortions in the echo path caused by loudspeaker nonlinearities.

The NL-AEC algorithm in accordance with the principles of the invention copes with nonlinear acoustic echo contributions caused by loudspeaker nonlinearities by properly employing the Back Electromotive Force (BEMF) signal induced in the loudspeaker coil due to its movement in a static magnetic field. Although this requires the measurement of an extra signal compared to state of the art AEC's, i.e., the electrical current, it also allows to significantly boost the echo cancellation performance. It is generally not necessary to measure the coil voltage because it can often be derived from the available far-end signal under some assumptions on the D/A-converter and amplifier such as linearity and low output impedance (FIG. 2). However, using a measured voltage usually yields a better performance of the method disclosed than using a voltage derived from the far-end signal. A key advantage of the present invention is that arbitrary nonlinearities in the mechanical part of the loudspeaker can be handled, whereas conventional nonlinear AEC methods need to estimate such nonlinearities, which is a very difficult and non-robust problem. In principle, when only the voltage is used as input signal, the loudspeaker is a nonlinear system with memory. Such systems are usually modeled by Volterra filters, neural networks, or NARMA models, which all require many coefficients and are difficult to adapt (see references 1 and 2).

In accordance with the principles of the invention, the loudspeaker 157 (FIG. 2) is modeled as a Hammerstein system, i.e., a memory-less function followed by a linear filter. This can only be done because the BEMF is used as the input signal, which is very natural and intuitive because in a sense the conversion from the electrical to the mechanical-acoustical domain always passes by means of the BEMF. A Hammerstein system is much easier to identify than a more general nonlinear system with memory.

In one aspect of the invention claimed the linear and non-linear parts of the echo estimate can be split, which is very useful for tuning and optimizing the post-processer 180. The development of the invention in the next section is based on this new insight. Since the invention claimed 'stays close to the physics', employing semi-physical modeling, only a few parameters are needed to represent the nonlinear part, as opposed to conventional methods that employ Volterra filters, for example. Finally, it may be seen in that the added value of the presented technique is more general because it can also be applied to, for example, sound reproduction and loudspeaker measurement, testing, and pre-compensation.

In principle, the problem to be solved concerns the identification of a nonlinear loudspeaker model (see reference 14) from relatively little a priori information, namely the loudspeaker voltage and current, and the microphone pressure. The model problem, available a priori information, and the current aspect of the invention are now explained in further detail.

In the analogue domain, the loudspeaker system is modeled as an electro-mechanical system consisting of the two differential equations represented by equations 5.1 and 5.2, where R and L are the electrical resistance and inductance of the coil respectively, and m(x), c(x) and k(x) are the mass, damping factor, and stiffness factor of the moving part of the loudspeaker respectively that may be dependent on the cone position.

$$v(t) = Ri(t) + L\frac{di(t)}{dt} + \phi(\chi(t))\dot{\chi}(t); \quad (5.1)$$

$$\phi(\chi(t))i(t) = m(\chi(t))\ddot{\chi}(t) + c(\chi(t))\dot{\chi}(t) + k(\chi(t))\chi(t), \quad (5.2)$$

The term φ (x(t)) i(t) in the force equation is the Lorentz force exerted on the moving part of the loudspeaker that is generated by the electrical current i(t) flowing through the coil in the magnetic field, which is maintained by a fixed permanent magnet in the magnetic gap of the loudspeaker, see FIG. 3.

The non-uniform force factor function, φ (x(t)), which is a function of the cone position x(t), represents the ratio of the Lorentz force to the current, hence the name force factor. It equals the magnetic flux density in the magnetic gap times the effective length of the coil wire in the magnetic field and is always a smooth positive-valued function of the cone position x. The term, φ (x(t))$\dot{\chi}$(t), in the voltage equation is the Back Electromotive Force (BEMF), u(t), induced by the movement of the coil 325 in the magnetic field. This BEMF opposes the driving voltage v(t), hence the qualifier 'back'.

For convenience of notation later on Equations 5.1 and 5.2 may now be written as Equations 5.3 and 5.4, respectively, utilizing the definitions shown in Equations 5.5 and 5.6.

$$\phi(\chi(t))\dot{\chi}(t) = u(t); \quad (5.3)$$

$$\phi(\chi(t))i(t) = f(t). \quad (5.4)$$

Equations 5.5 and 5.6 define the BEMF and Lorentz force respectively.

$$u(t) \stackrel{\Delta}{=} v(t) - Ri(t) - L\frac{di(t)}{dt}; \quad (5.5)$$

$$f(t) \stackrel{\Delta}{=} \phi(\chi(t))i(t), \quad (5.6)$$

Now, combining the equations above yields the following relationships shown in Equations 5.7 and 5.8:

$$u(t) \stackrel{\Delta}{=} \phi(\chi(t))\dot{\chi}(t) = v(t) - Ri(t) - L\frac{di(t)}{dt}; \quad (5.7)$$

$$f(t) \stackrel{\Delta}{=} \phi(\chi(t))i(t) = m(\chi(t))\ddot{\chi}(t) + c(\chi(t))\dot{\chi}(t) + k(\chi(t))\chi(t). \quad (5.8)$$

The first equation in each system, i.e., Equations 5.1, 5.3 and 5.7, will be referred to as voltage equation. Likewise, the second equation in each system, i.e., Equations 5.2, 5.4, and 5.8 are referred to as force equations. FIGS. 5 and 6 give two different representations of the same system of differential equations. FIG. 5 portrays the physical setup of the model, whereas FIG. 6 depicts a functional block diagram highlighting the structure of the differential equations. As is shown explicitly in FIGS. 5 and 6, the mass, stiffness and spring factors may be dependent on the cone position. In principle, among the quantities in the equations above, only the voltage v(t) and electrical current i(t) are known.

Next, the observed microphone pressure p(t) is expressed as a filtered version of the cone displacement x(t) and cone velocity $\dot{\chi}$(t), respectively. If the observed microphone pressure p(t) is considered as a linearly filtered version of the cone displacement x(t) with filter $h_x$(t), it can be expressed as shown in Equation 5.9 where $h_x$(t) is the acoustic impulse response from the cone displacement to the microphone pressure.

$$p(t) = (h_x * \chi)(t), \quad (5.9)$$

Figure 7:
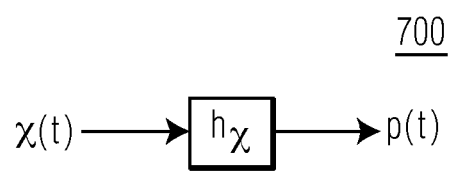
FIG. 7 illustrates a block diagram of the observed microphone pressure as a linearly filtered version of the cone displacement.

FIG. 7 illustrates a block diagram representation of observing microphone pressure p(t) as a linearly filtered version of the cone displacement.

Likewise, if the observed microphone pressure p(t) is considered as a linearly filtered version of the cone velocity $\dot{\chi}$(t) with the filter h(t) can be expressed as shown in equation 5.10, where h(t) is the acoustic impulse response from the cone velocity to the microphone pressure.

$$p(t)(h * \dot{\chi})(t) \quad (5.10)$$

Figure 8:
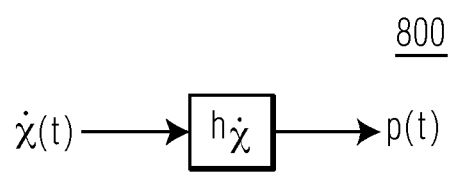
FIG. 8 illustrates a block diagram of the observed microphone pressure as linearly filtered version of the cone velocity.

FIG. 8 illustrates a block diagram representation of observing microphone pressure p(t) as a linearly filtered version of the cone velocity.

It should be recognized that similar relations may be derived using the cone acceleration instead of position x(t) or velocity $\dot{\chi}$(t). And, thus are considered within the scope of the invention claimed. Note that $h_x$(t) is the time derivative of $h_{\dot{x}}$(t), and thus $h_{\dot{x}}$(t) is the integral of $h_x$(t) with respect to time.

The total model from the voltage input signal v(t) to the observed microphone pressure p(t) consists of two parts. The first part is the nonlinear system with memory depicted in FIG. 6, wherein its input signal is the coil voltage v(t), and its output signal can be chosen as either the cone position x(t) or velocity $\dot{\chi}$(t) (or acceleration). The second part, which is concatenated with the first, consists of one of the linear observation models that have been discussed in the previous section, and are depicted in FIGS. 7 and 8. Its input signal can be chosen as either the cone position x(t) or velocity $\dot{\chi}$(t), and its output signal is the microphone pressure p(t). Hence, the choices available for the total model consist of the concatenation of FIG. 6 with either FIG. 7 or 8 (and an additional one if we also consider the cone acceleration). In fact, it is also possible to use both input signals, i.e., the cone position and velocity. In this case, two linear filters have to be estimated, one from position to microphone pressure and one from velocity to microphone pressure.

Now, in view of FIG. 2, assuming that the voltage v(t) across the terminals of the loudspeaker coil is known, the current i(t) through the coil, and the microphone pressure p(t), the total system may be identified in such a way that an estimate of p(t) from v(t) and i(t) can be determined. In principle, the identification consists of several parts. Firstly, the parameters R and L have to be estimated from the voltage v(t) and current, i(t). Since in principle these values can be determined relatively easy from 'small-signal' measurements of the electrical impedance (also in adaptive and real-time mode), these values are assumed to be known. Secondly, the force factor function φ (.), or a function directly related to it, and the linear system which outputs the microphone pressure, i.e., $h_x$(t) or h(t), have to be identified. This has to be done in such a way that the error between the true and estimated microphone pressure is as small as possible. In the sequel we will develop the proper framework for doing this.

A relation between the cone position, the voltage, current, resistance, inductance, non-uniform force factor function, and the microphone pressure may now be determined. More specifically, if the force factor function φ (.) is known the cone position can be computed using only the BEMF as an input signal.

Although in practice φ (.) is not known, this calculation provides the insight needed for developing the new algorithm disclosed, in which it is estimated properly. The derivation is based solely on voltage Equation 5.3, which states that the cone displacement x(t) is the solution of the first order (generally) nonlinear ordinary differential equation given by Equation 5.11, where the driving term u(t) is the BEMF.

$$\phi(\chi(t))\frac{d\chi(t)}{dt} = u(t), \tag{5.11}$$

As can easily be recognized, Equation 5.11 is a separable differential equation. Thus, integrating both sides of Equation 5.11 from $t_0$ to t yields Equation 5.12, where $\Phi$ (x) is the primitive of the force function $\phi$ (.) at position x ($\phi$(x)).

$$\int_{t_0}^{t} u(\eta)d\eta = \int_{t_0}^{t} \phi(\chi(\eta))\frac{d\chi(\eta)}{d\eta}d\eta \tag{5.11}$$

$$= \int_{\chi(t_0)}^{\chi(t)} \phi(\theta)d\theta = \Phi(\chi(t)) - \Phi(\chi(t_0)),$$

$$\Phi(\chi(t)) = \Phi(\chi(t_0)) + \int_{t_0}^{t} u(\eta)d\eta, \tag{5.12}$$

This may be expressed as shown in equation 5.13.

$$\Phi(\chi) \triangleq \int_{\theta_0}^{\chi} \phi(\theta)d\theta \text{ SATISFIES } \Phi'(\chi) = \frac{d\Phi(\chi)}{d\chi} = \phi(\chi). \tag{5.13}$$

For convenience of notation equations 5.14 and 5.15 represent definitions that are used from hereinforward, wherein, w(t) is the integral of the BEMF u(t).

$$\omega(t) \triangleq \Phi(\chi(t_0)) + \int_{t_0}^{t} u(\eta)d\eta \tag{5.14}$$

$$\dot{\omega}(t) = u(t), \tag{5.15}$$

Note that w(t) is a known signal because it can be derived from the known BEMF signal u(t) that can be constructed from the coil voltage, current, resistance and inductance. From Equations 5.12 and 5.14, w(t) may be determined by Equation 5.16.

$$\omega(t) = \Phi(\chi(t)) = (\Phi \circ \chi)(t) = \Phi(\chi(t_0)) + \int_{t_0}^{t} u(\eta)d\eta. \tag{5.16}$$

Thus, possibly apart from the irrelevant constant $\phi(x(t_0))$, we have access to a known signal, namely the integrated BEMF, w(t), that is an instantaneously and nonlinearly transformed version of the cone displacement x(t). Moreover, the involved memoryless non-uniform function is precisely the antiderivative of $\phi$ (.).

Note that w(t) in Equation 5.16 is also written as the composition of the function x(.) followed by the function $\phi$ (.).

Letting $\psi$ (.) be the inverse function of $\phi$(x), Equation 5.16 implies Equation 5.17.

$$(\Psi \circ \Phi)(\chi) = \Psi(\Phi(\chi)) = \Phi^{-1}(\Phi(\chi)) = I(\chi) = \chi$$

$$(\Phi \circ \Psi)(\omega) = \Phi(\Psi(\omega)) = \Phi(\Phi^{-1}(\omega)) = I(\omega) = \omega$$

$$\chi(t) = \Psi(\omega(t)) = (\Psi \circ \omega)(t) = \Psi(\Phi(\chi(t_0)) + \int_{t_0}^{t} u(\eta)d\eta). \tag{5.17}$$

Figure 9:
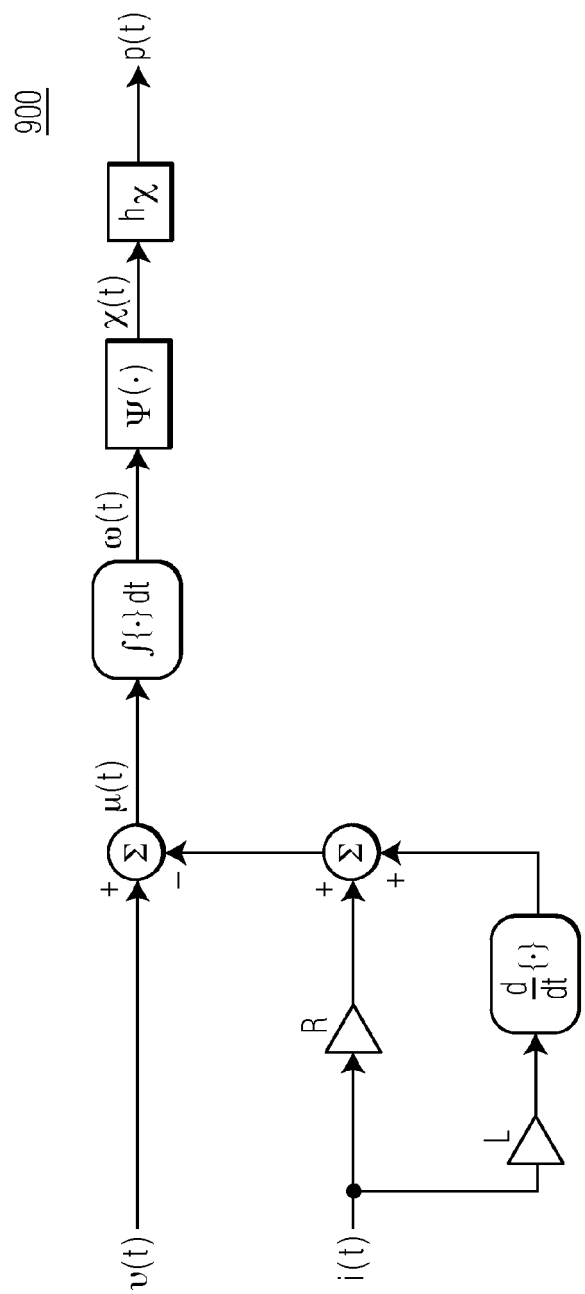
FIG. 9 illustrates a block diagram of a Hammerstein system with BEMF as an input and cone position as an intermediate signal in accordance with the principles of the invention.
Figure 10A:
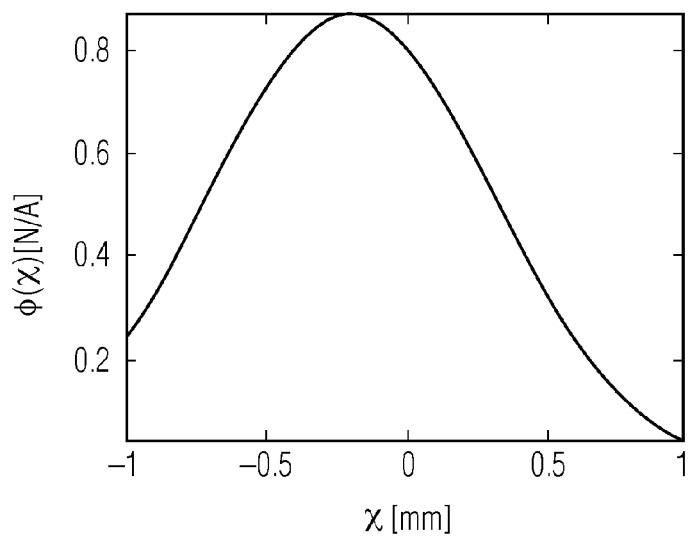
FIGS. 10a and 10b illustrate graphs of the force factor function and its primitive, respectively of a first example in accordance with the principles of the invention.
Figure 10B:
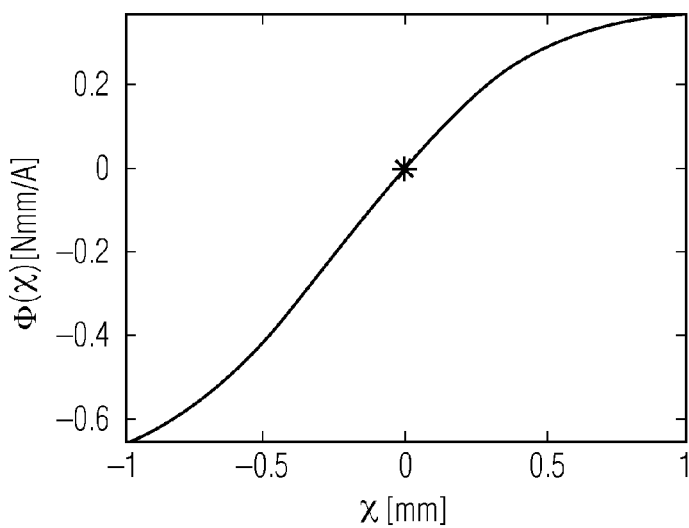
Figure 11A:
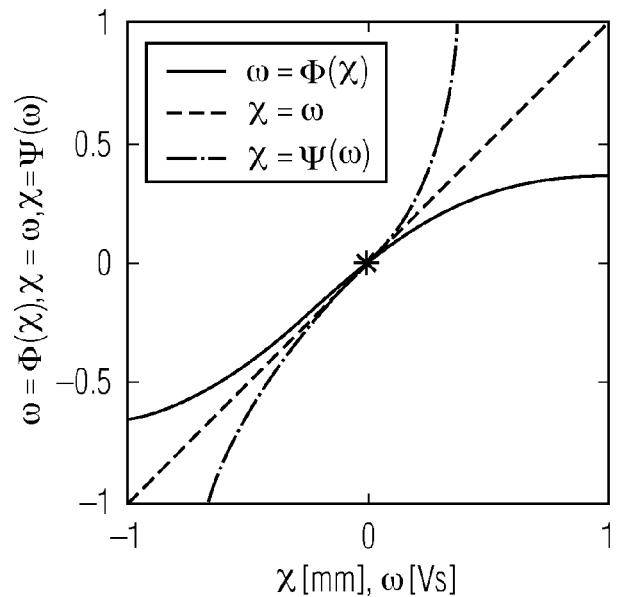
FIGS. 11a and 11b illustrate graphs of the force factor function primitive and its linear approximation, respectively, of the first example in accordance with the principles of the invention.
Figure 11B:
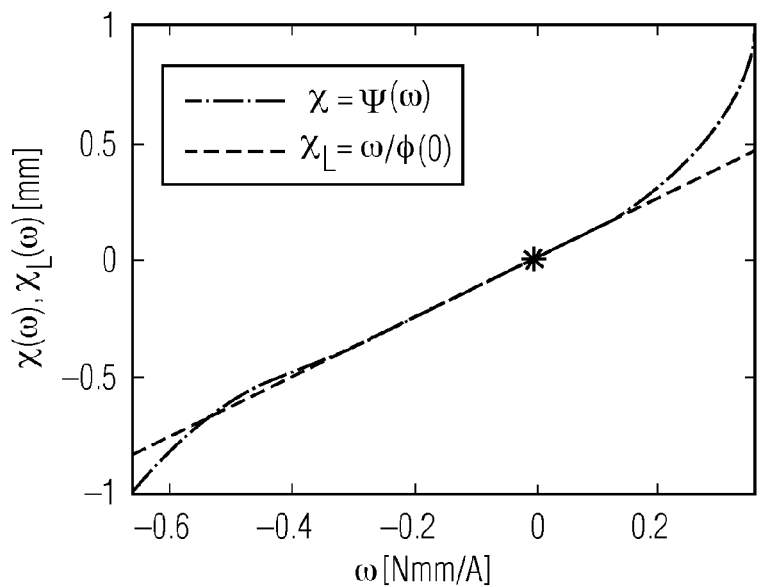
Figure 12A:
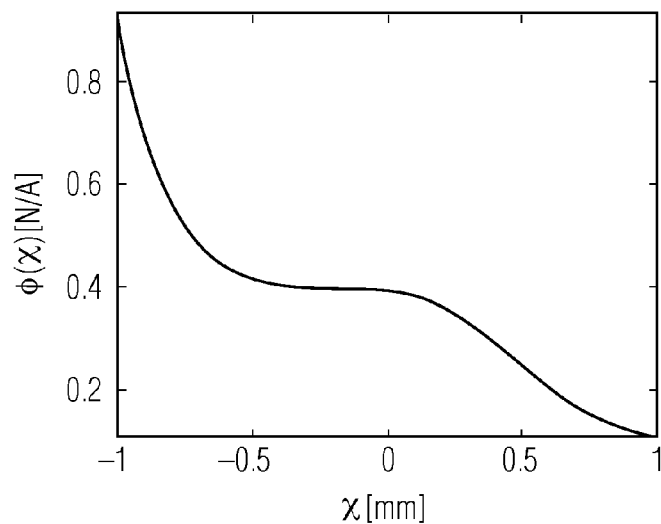
FIGS. 12a and 12b illustrate graphs of another example of the force factor function and its primitive, respectively of a second example in accordance with the principles of the invention.
Figure 12B:
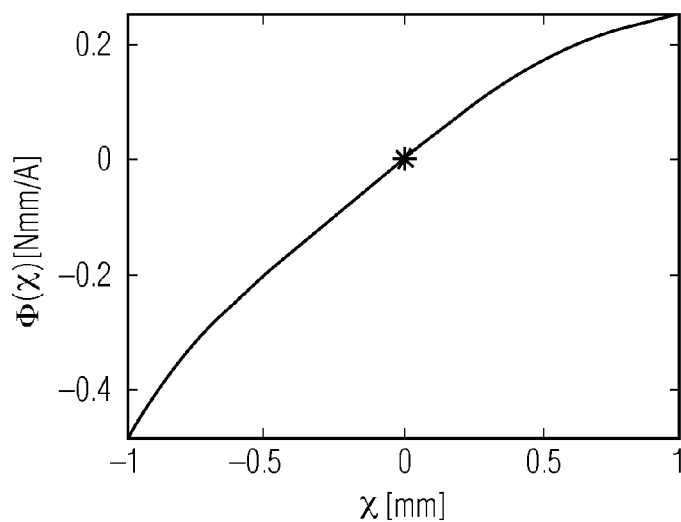
Figure 13A:
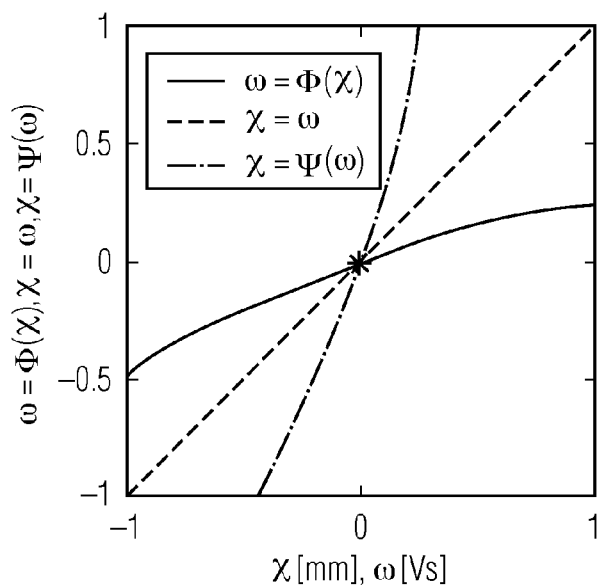
FIGS. 13a and 13b illustrate graphs of the force factor function primitive and its linear approximation, respectively of the second example in accordance with the principles of the invention.
Figure 13B:
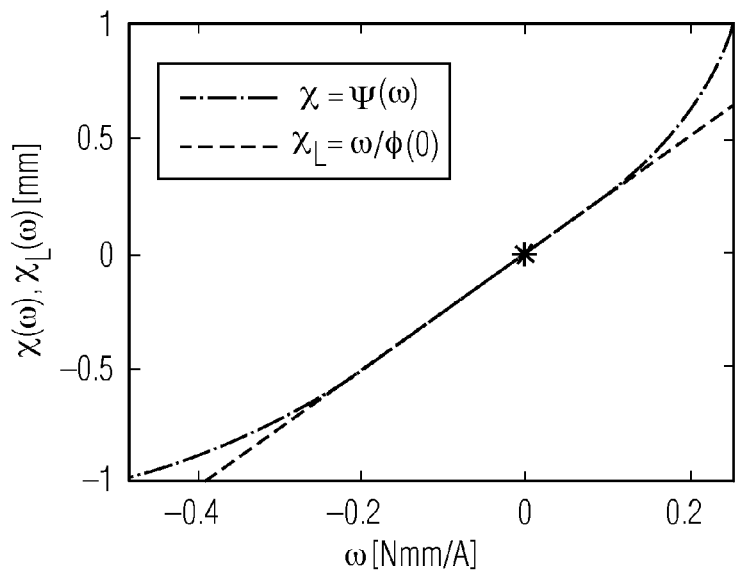

That is, the cone position x(t) is an instantaneously and nonlinearly transformed version of the known signal w(t). Moreover, the involved memory-less non-uniform function is precisely the inverse of the anti-derivative of $\phi$ (.). FIG. 9 illustrates a block diagram of a Hammerstein system with BEMF as an input and cone position as an intermediate signal wherein a concatenation of a non-uniform memory-less function and a linear system in accordance with the principles of the invention.

Note that the function w (w)→$\psi$(w)=$\phi^{-1}$(w) exists on the relevant domain because it is the inverse of the function $\phi$(x) which is injective due to the fact that the force factor $\phi$ (.) at position x ($\phi$(x)) is positive everywhere. Thus, Equations 5.16 and 5.17 may be expressed as Equations 5.18, 5.19, respectively.

$$\chi \xrightarrow{\Phi} \Phi(\chi) = \omega \xrightarrow{\Phi^{-1} = \Psi} \Psi(\omega) = \Phi^{-1}(\omega) = \chi. \tag{5.18}$$

$$\omega = \Phi(\chi)$$

$$\chi = \Psi(\omega) = \Phi^{-1}(\omega) \tag{5.19}$$

Now, from Equations 5.13-5.19, $\dot{\chi}$(t) may be expressed in terms of the known signals u(t) and w(t) as shown in equation 5.20.

$$\dot{\chi}(t) \triangleq \frac{d\chi(t)}{dt} = \frac{d\Psi(\omega(t))}{dt} = \Psi'(\omega(t))\dot{\omega}(t) = \Psi'(\omega(t))u(t),$$

WHERE $\Psi'(\omega)$ IS GIVEN BY:

$$\Psi'(\omega) \triangleq \frac{d\Psi(\omega)}{d\omega} = \frac{1}{\Phi'(\Psi(\omega))} = \frac{1}{\phi(\Psi(\omega))} = \frac{1}{(\phi \circ \Psi)(\omega)}. \tag{5.20}$$

Hence, $\dot{\chi}$(t) can be written as shown in Equation 21.

$$\dot{\chi}(t) = \Psi'(\omega(t))\dot{\omega}(t) = \Psi'(\omega(t))u(t) = \frac{u(t)}{\phi(\Psi(\omega(t)))}. \tag{5.21}$$

Thus, the cone velocity $\dot{\chi}$(t) equals the BEMF divided by an instantaneously and nonlinearly transformed version of the known signal w(t). Moreover, the involved memory-less non-uniform function is precisely the force factor function $\Phi$ (.). Note that equation 5.21 is consistent with Equation 5.3 because $\psi$(w(t))=x(t) according to equation 5.17.

Figure 14:
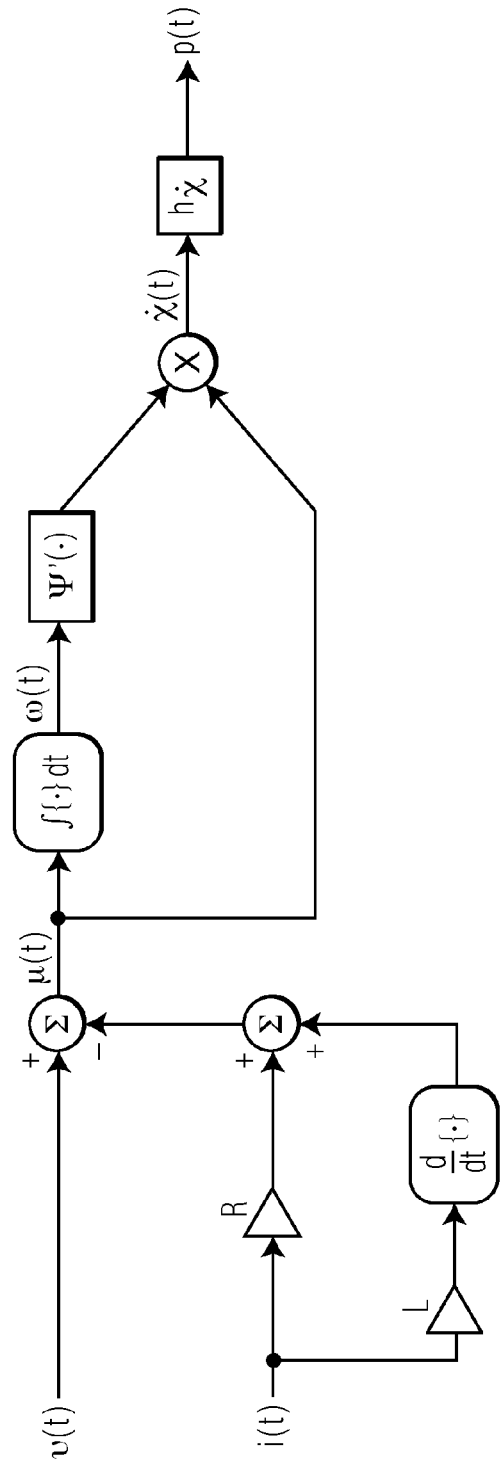
FIG. 14 illustrates a block diagram of a Hammerstein system with BEMF as an input and cone velocity as an intermediate signal in accordance with the principles of the invention.

FIG. 14 represents a block diagram of a Hammerstein-like system with BEMF as an input and cone velocity as an intermediate signal wherein a concatenation of a non-uniform memory-less function and a linear system in accordance with the principles of the invention. In this case, the memory-less function is represented up to term $\dot{\chi}$(t).

For reference purposes, the most important relationships are summarized in Equations 5.22a through 5.22i. FIGS. 10-13 illustrate graphs of the functions shown in Equations 5.22a through 5.22i for two different exemplary force factor functions.

$$\Phi(\chi) = \int_{\theta_0}^{\chi} \phi(\theta)d\theta \Leftrightarrow \Phi'(\chi) = \phi(\chi); \tag{5.22a}$$

-continued $$\Psi(\omega) = \Phi^{-1}(\omega); \quad (5.22b)$$

$$\Psi'(\omega) = \frac{1}{\Phi'(\chi)} = \frac{1}{\phi(\Psi(\omega))} = \frac{1}{(\phi \circ \Psi)(\omega)}; \quad (5.22c)$$

$$\omega = \Phi(\chi) \Leftrightarrow \chi = \Psi(\omega); \quad (5.22d)$$

$$(\Psi \circ \Phi)(\chi) = I(\chi) = \chi, \quad (\Phi \circ \Psi)(\omega) = I(\omega) = \omega; \quad (5.22e)$$

$$\omega(t) = (\Phi \circ \chi)(t) = \Phi(\chi(t)) = \Phi(\chi(t_0)) + \int_{t_0}^{t} u(\eta) d\eta; \quad (5.22f)$$

$$\chi(t) = (\Psi \circ \omega)(t) = \Psi(\omega(t)) = \Psi\left(\Phi(\chi(t_0)) + \int_{t_0}^{t} u(\eta) d\eta\right); \quad (5.22g)$$

$$\dot{\omega}(t) = u(t); \quad (5.22h)$$

$$\dot{\chi}(t) = \Psi'(\omega(t))\dot{\omega}(t) = \Psi'(w(t))u(t) = \frac{u(t)}{\phi(\Psi(\omega(t)))} = \frac{u(t)}{(\phi \circ \Psi \circ \omega)(t)}. \quad (5.22i)$$

With the analysis and equations provided herein, given the required measured and/or estimated electrical quantities and parameters, i.e., the voltage, current, resistance and inductance, they may now be related to the microphone pressure p(t) by combining the results obtained so far.

Firstly, we consider the situation in which the microphone pressure p(t) is expressed as a linearly filtered version of the cone position x(t) with filter $h_\chi(t)$.

Combining Equations 5.9 and 5.17 yields Equation 5.23.

$$p(t)=(h_\chi*\chi)(t)=(h_\chi*\Psi(\omega))(t)=(h_\chi*(\Psi\circ\omega))(t). \quad (5.23)$$

This equation shows that in order to obtain p(t) from the known signal w(t) we first have to apply the non-uniform memory-less function ψ (.) to w(t) and then filter the resulting signal with the linear filter $h_\chi$. FIG. 9 illustrates a block diagram representation of these operations. Such a concatenation of a (non-uniform) memory-less function and a linear system is typically called a Hammerstein system in the literature (see reference 15). In principle, it is easy to design a nonlinear joint adaptation algorithm for a Hammerstein system (e.g., reference 15) as will be described with regard to Equations 5.36-5.38. Note that we can obtain more insight into the nonlinear part of the pressure, i.e., the nonlinear contributions to the echo signals caused by the non-uniformess of the force factor function (φ(.)), by expanding ψ (w) in Equation 5.23 in terms of monomial basis functions to obtain Equation 5.24, where the coefficients $a_0 \ldots a_{Q-1}$ can be obtained from the Taylor series expansion of ψ (w).

$$\Psi(\omega) \approx \sum_{q=0}^{Q-1} a_q \omega^q, \quad (5.24)$$

Substituting the Taylor series expansion into Equation 5.23 yields the following:

$$p(t) = (h_\chi * \Psi(\omega))(t) \approx \sum_{q=0}^{Q-1} a_q (h_\chi * \omega^q)(t)$$

$$= a_0(h_\chi * 1)(t) + a_1(h_\chi * \omega)(t) + a_2(h_\chi * \omega^2)(t) + a_3(h_\chi * \omega^3)(t) + \ldots$$

The first two terms contribute to the linear part, whereas the other terms contribute to the nonlinear part.

Now, we consider the situation in which the microphone pressure p(t) is expressed as a linearly filtered version of the cone velocity $\dot{\chi}(t)$ with filter h(t). Combining equation 5.10 and equation 5.21 yields equation 5.25.

$$p(t)=(h*\dot{\chi})(t)=(h*((\Psi'\circ\omega)\cdot u))(t). \quad (5.25)$$

This equation shows that in order to obtain p(t) from u(t) and w(t), we first have to apply the non-uniform memory-less function ψ'(.) to w(t), then multiply the result by u(t), and finally filter the resulting signal with the linear filter h. Apart from the multiplication of the output of the memory-less function by another signal, this again constitutes a Hammerstein system. See FIG. 14 for a block diagram representation of these operations.

Again insight may be obtained into the nonlinear part of the pressure by expanding ψ'(w) in Equation 5.25 in terms of monomial basis functions as shown in equation 5.26, where the coefficients $b_0 \ldots b_{P-1}$ can be obtained from the Taylor series expansion of ψ'(w).

$$\Psi'(\omega) \approx \sum_{p=0}^{P-1} b_p \omega^p, \quad (5.26)$$

Substituting this expansion into Equation 5.25 yields:

$$p(t) = (h_\chi * \dot{\chi})(t) = (h_\chi * ((\Psi' \circ \omega) \cdot u))(t) \approx \sum_{p=0}^{P-1} b_p (h_\chi * (\omega^p \cdot u))(t)$$

$$= b_0(h_\chi * u)(t) + b_1(h_\chi * (\omega \cdot u))(t) + b_2(h_\chi * (\omega^2 \cdot u))(t) +$$

$$b_3(h_\chi * (\omega^3 \cdot u))(t) + \ldots$$

In this case, only the first term contributes to the linear part, whereas the other terms contribute to the nonlinear part. Note that if we derive Equation 5.26 from Equation 5.24, then P=Q-1 and $b_p=(p+1)a_{p+1}$.

Considering the results from the previous sections NL-AEC algorithms in accordance with the principles of the invention may be determined.

In view of FIGS. 2 and 9, the development of an algorithm that can perform nonlinear echo cancellation has now been reduced to the identification of a Hammerstein model with the integral w(t) of the back EMF u(t) as its input signal and the microphone pressure p(t) as its output signal. Although not shown, when the velocity is used as the intermediate signal we have a similar identification problem, which would be recognized by those skilled in the art. (see FIGS. 2 and 14).

Figure 15:
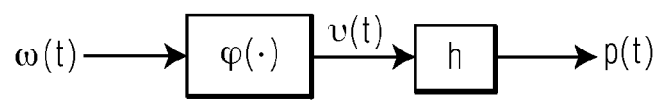
FIG. 15 illustrates a block diagram of a Hammerstein system.

FIG. 15 illustrates a general Hammerstein system with input signal w(t), non-uniform function φ (.), intermediate signal v(t), linear filter h, and output signal p(t) in accordance with the principles of the invention. For example, we can map FIG. 9 to FIG. 15 by choosing φ (.)=ψ (.) and v(t)=x(t).

Figure 16:
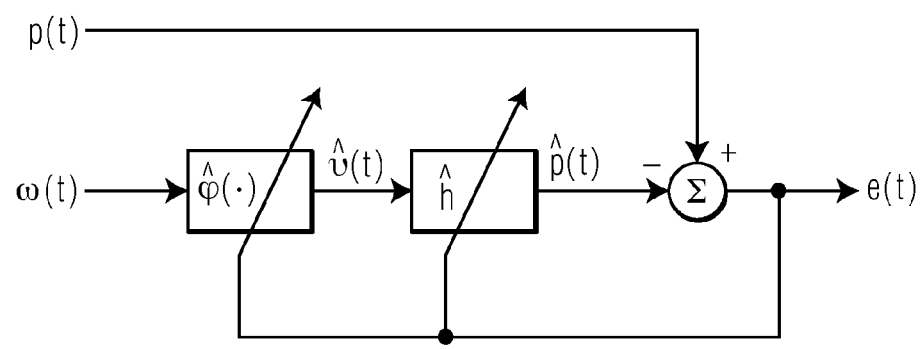
FIG. 16 illustrates a block diagram for identification of a Hammerstein system.

Given the signals w(t) and p(t), the purpose of identifying the Hammerstein system is to find estimates $\hat{\phi}(.)$ and $\hat{h}$ of φ(.) and h, respectively, such that 'Hammersteining' the signal w(t) yields an estimate $\hat{p}(t)$ of p(t) that minimizes the error $e(t) \triangleq p(t) - \hat{p}(t)$ in some sense, for example in the mean square sense. FIG. 16 illustrates this idea.

The identification of a Hammerstein model is typically done by expressing the memory-less non-uniform function as a linear combination of basis functions. In accordance with the principles of the invention, $\hat{\phi}(\omega)$ in FIGS. 15 and 16 can be written as a finite linear combination of a certain set of known and fixed basis functions $\phi_0(w) \ldots \phi_{P-1}(w)$, which may be expressed as Equation 5.27, where W is the domain of interest of w, i.e., the set of values that w can assume (in practice), and $\hat{b} \triangleq [\hat{b_0} \ldots \widehat{b_{P-1}}]^T$ is the vector of parameters representing the basis coefficients.

$$\hat{\varphi}(\omega) = \varphi(\omega; \hat{b}) \triangleq \sum_{p=0}^{P-1} \hat{b}_p \varphi_p(\omega) \; \forall \; \omega \in W, \qquad (5.27)$$

The identification of a Hammerstein model is also possible by using a nonlinear parametrization for the memory-less non-uniform function and estimating those parameters (together with the following linear system, of course).

Because in practice we work with digital signals, we assume that all signals have been sampled with sampling frequency $f_s$ and use the notation $q[n]$ to denote the signal $q(t)$ sampled at time $t = n/f_s$. That is, $q[n] = q(n/f_s)$. Assuming that the digital FIR filter $\hat{h} \triangleq [\hat{h}_0 \ldots \widehat{h_{N-1}}]^T$ has length N, the digital version of the estimated output $\hat{p}(n)$ of the Hammerstein system in FIG. 16 can be written as:

$$\hat{p}[n] = \sum_{i=0}^{N-1} \hat{h}_i \hat{v}[n-i] = \sum_{i=0}^{N-1} \hat{h}_i \varphi(\omega[n-i]; \hat{b}).$$

Now defining Equation 5.28 and combining the equations above yields the expression of $\hat{p}(n)$ in all unknown parameters resulting in Equation 5.29.

$$\xi_p(n; \hat{h}) \triangleq \sum_{i=0}^{N-1} \hat{h}_i \varphi_p(\omega[n-i]) \qquad (5.28)$$

$$\hat{p}[n] = \sum_{i=0}^{N-1} \sum_{p=0}^{P-1} \hat{h}_i \hat{b}_p \varphi_p(\omega[n-i]) = \sum_{i=0}^{N-1} \hat{h}_i \varphi(\omega[n-i]; \hat{b}) \qquad (5.29)$$

$$= \sum_{p=0}^{P-1} \hat{b}_p \xi_p(n; \hat{h}).$$

Figure 17:
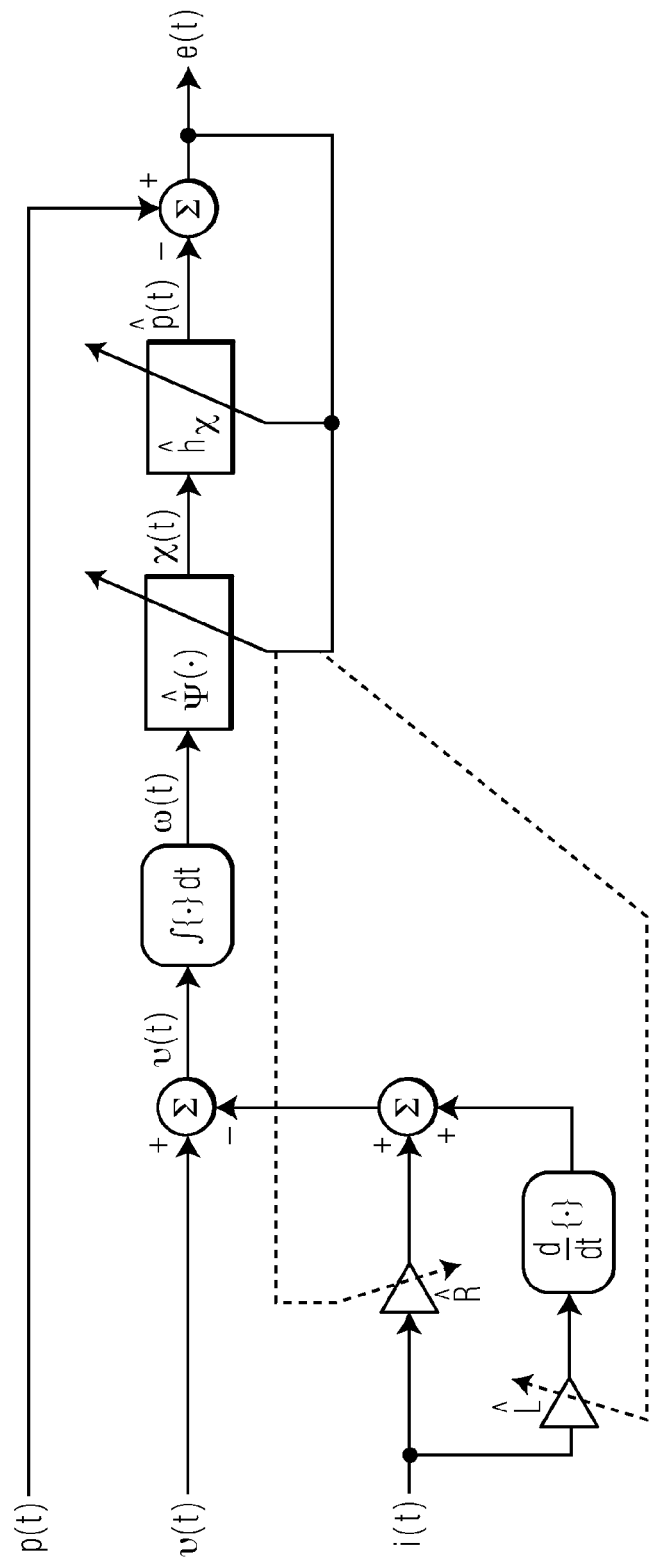
FIG. 17 illustrates a block diagram of the identification of a loudspeaker model with BEMF input, in accordance with the principles of the invention.

Based on this expression, we may derive two algorithms for identifying $\hat{h}$ and $\hat{b}$ by minimizing the following error signal over a certain interval as shown in Equation 5.30.

$$e[n] \triangleq p[n] - \hat{p}[n] = p[n] - \sum_{i=0}^{N-1} \sum_{p=0}^{P-1} \hat{h}_i \hat{b}_p \varphi_p(\omega[n-i]). \qquad (5.30)$$

wherein $e[n]$ represents a residual error between the pressure ($p[n]$) and the estimate of the pressure $\hat{p}[n]$ FIG. 17 illustrates this idea in the time-continuous domain for the invention disclosed where $\phi(.)$ and h in FIG. 15 are given by $\phi(.) = \psi(.)$ and $h = h_x$ respectively.

Defining the matrices shown in Equations 5.31 and 5.32, the vector $p[n]$ containing the last M samples of $p[n]$ can be written as shown in Equation 5.33.

$$\Phi[n; \hat{b}] \triangleq \begin{bmatrix} \varphi(\omega[n]; \hat{b}) & \varphi(\omega[n-1]; \hat{b}) & \ldots & \varphi(\omega[n-N+1]; \hat{b}) \\ \varphi(\omega[n-i]; \hat{b}) & \varphi(\omega[n-2]; \hat{b}) & \ldots & \varphi(\omega[n-N]; \hat{b}) \\ \vdots & \vdots & \ddots & \vdots \\ \varphi(\omega[n-M+1]; \hat{b}) & \varphi(\omega[n-M]; \hat{b}) & \ldots & \varphi(\omega[n-N-M+2]; \hat{b}) \end{bmatrix} \qquad (5.31)$$

AND $$\Xi[n; \hat{h}] \triangleq \begin{bmatrix} \xi_0(n; \hat{h}) & \xi_1(n; \hat{h}) & \ldots & \xi_{P-1}(n; \hat{h}) \\ \xi_0(n-1; \hat{h}) & \xi_1(n-1, \hat{h}) & \ldots & \xi_{P-1}(n-1; \hat{h}) \\ \vdots & \vdots & \ddots & \vdots \\ \xi_0(n-M+1; \hat{h}) & \xi_1(n-M+1; \hat{h}) & \ldots & \xi_{P-1}(n-M+1; \hat{h}) \end{bmatrix}, \qquad (5.32)$$

$$p[n] = \Phi[n; \hat{b}] \hat{h} = \Xi[n; \hat{h}] \hat{b}. \qquad (5.33)$$

Given an estimate of the filter function, $\hat{h}$, then the determination of the estimation, $\hat{b}$, is a linear estimation problem and vice versa. From linear algebra, it follows directly that $\hat{h}$ and $\hat{b}$ can be estimated by iteration of pseudo-inverses. Effectively, this procedure comes down to minimizing the cost function shown $$J_p[n] \triangleq \Sigma_{m=0}^{M-1}(e[n-m])^2)$$

defined over M time samples with $e[n]$ defined in Equation 5.30. After $\hat{h}$ and $\hat{b}$ have been obtained using algorithm 1, $\hat{p}(n)$ can be computed from Equation 5.29.

In one aspect of the invention, a practical algorithm (algorithm 1) for estimation of $\hat{h}$ and $\hat{b}$ from M data samples using a certain number of iterations may be presented as:

1: INITIALIZE h (OR b FOR REVERSE ORDER ITERATION);
2: GIVEN h, COMPUTE b AS FOLLOWS:

$$\hat{b} = (\Xi[n; \hat{h}])^+ p[n]. \qquad (5.34)$$

3: GIVEN $\hat{b}$, COMPUTE $\hat{h}$ FROM THE FOLLOWING SYSTEM OF EQUATIONS:

$$\hat{h} = (\Phi[n; \hat{b}])^+ p[n]. \qquad (5.35)$$

4: GOTO STEP 2.

Thus, given the estimation of the filter function, ĥ, then b̂ may be determined from Equation 5.34. On the other hand, given the estimation, b̂, then ĥ may be determined from Equation 5.35.

In another aspect of the invention, different adaptive algorithms that can run in real-time on a portable device may easily be obtained using the error signal defined in Equation 5.30. As an example, here we present a joint (N)LMS-like algorithm. Based on e[n] we define the following instantaneous cost function as:

$$J[n] \equiv J(\hat{h}[n], a[n]) \stackrel{\Delta}{=} \quad (5.36)$$

$$(e[n])^2 = \left(p[n]) - \sum_{i=0}^{N-1}\sum_{p=0}^{P-1} \hat{h}_i[n]\hat{b}_p[n]\varphi_p(w[n-i])\right)^2.$$

The gradients $\nabla_{\hat{h}}J[n]$ and $\nabla_{\hat{b}}J[n]$ of this function with respect to the parameter vectors ĥ(n) and b̂(n) respectively are easily obtained by derivation. More specifically, the gradient J[n] with respect to any parameter θ is given by:

$$\nabla_\theta J[n] = \nabla_\theta\{(e[n])^2\} = 2e[n]\nabla_\theta\{(e[n])\}.$$

Now from 5.30 it follows that the gradient $\nabla_\theta\{(e[n])\}$ is given by:

$$\nabla_\theta\{(e[n])\} = -\nabla_\theta\{\hat{p}[n]\}.$$

and the gradient J[n] may further be represented as:

$$\nabla_\theta J[n] = -2e[n]\nabla_\theta\{\hat{p}[n]\}.$$

The gradients of p̂[n] with respect to ĥx and b̂x (denoted as âx) may be given by:

$$\nabla_{\hat{h}_\chi}\hat{p}[n] = \Psi(w[n]; \hat{a}) = \Psi_b[n]\hat{a}$$

AND $$\nabla_{\hat{a}}\hat{p}[n] = \xi[n; \hat{h}_\chi] = (\Phi_b[n])^t\hat{h}_\chi$$

Hence, substituting these results finally yields;

$$\nabla_{\hat{h}_\chi}J[n] = -2e[n]\Psi(x[n]; \hat{a}) = 2e[n]\Psi_b[n]\hat{a} = -2e[m]\hat{x}[n]$$

AND $$\nabla_{\hat{a}}J[n] = -2e[n]\xi[n; \hat{h}_\chi] = -2e[n](\Psi_b[n])^T\hat{h}_\chi.$$

Now, for example we can use the standard (N)LMS-type learning rules for updating ĥ(n) and b̂(n) as shown in Equations 5.37 and 5.38.

$$\hat{h}[n+1] = \hat{h}[n] - \frac{\mu_h[n]}{2}\nabla_{\hat{h}}J[n] \quad (5.37)$$

AND $$\hat{b}[n+1] = \hat{b}[n] - \frac{\mu_a[n]}{2}\nabla_{\hat{b}}J[n]. \quad (5.38)$$

A practical algorithm (i.e., algorithm 2) for estimation of ĥ and b̂ using a joint adaptive algorithm may be presented as:
1: INITIALIZE ĥ[n] (OR b̂[n] FOR REVERSE ORDER ITERATION);

2: GIVEN ĥ[n], UPDATE b̂[n] AS FOLLOWS:

$$\hat{b}[n+1] = \hat{b}[n] - \frac{\mu_a[n]}{2}\nabla_{\hat{b}}J[n]. \quad (5.39)$$

3: GIVEN b̂[n], COMPUTE ĥ[n] FROM THE FOLLOWING SYSTEM OF EQUATIONS:

$$\hat{h}[n+1] = \hat{h}[n] - \frac{\mu_h[n]}{2}\nabla_{\hat{h}}J[n]. \quad (5.40)$$

4: GOTO STEP 2.

The order of the update rules in equations 5.39 and 5.40 is not important and may thus be interchanged without altering the scope of the invention.

As would be recognized, this algorithm can easily be modified by using other adaptive algorithms such as Block LMS, RLS, APA, etc. (see reference 6) for either ĥ or b̂ or both.

Thus, given ĥ[n] then b̂[n] may be updated utilizing Equation 5.39 and given b̂[n] then ĥ[n] may be determined utilizing Equation 5.40.

Note that we can also a similar algorithm if we parametrize φ (.) in FIG. 15 by a function that is nonlinear in its parameters, as opposed to a function that is expressed as a linear combination of basis functions. In this case, the gradient in equation 5.39 is replaced by the gradient of the chosen nonlinear parametric function with respect to its parameters.

For any algorithm developed according to the principles developed above, based on the quality of the measured signals, the identification process may be optimized, for example, by trying to cancel remaining echoes in [n] by identifying a filter from the voltage or current to [n]. Also, adaptive filters may be placed in parallel with the schemes developed above, e.g., add another term to ĥ[n] that is a linearly filtered version of v[n] or i[n] only. As would be recognized by those skilled in the art, many different adaptation schemes are possible from the description of the invention provided herein. In addition, note that after slight modifications both algorithms described above can be used for finding the unknown parameters when the velocity instead of the position is estimated as the intermediate signal acting as the input of the linear adaptive filter, i.e., slightly modified versions of the algorithms can also be used for identification of the scheme depicted in FIG. 14. As we have already remarked earlier, it is also possible to use both input signals and identify the two corresponding (related) linear filters. Finally, it is also important to note that using the schemes developed above, estimates of the resistance and inductance of the coil may be determined because these parameters can also be seen as variables for which the cost function has to be optimized. This is achieved by incorporating update rules that are similar to 5.39 and 5.40 for R and L in the algorithm.

Experiments have revealed that using the BEMF directly as an input signal to a linear (adaptive) filter, whose output is the estimated echo component in the microphone signal, already yields a significant improvement in echo cancellation performance. Therefore, an algorithm which does not estimate a nonlinear function that precedes the linear filter in a Hammerstein system, but simply performs conventional linear echo cancellation, but by using the (non-standard) BEMF as its input signal, is also claimed as a part of the invention disclosed.

Figure 18:
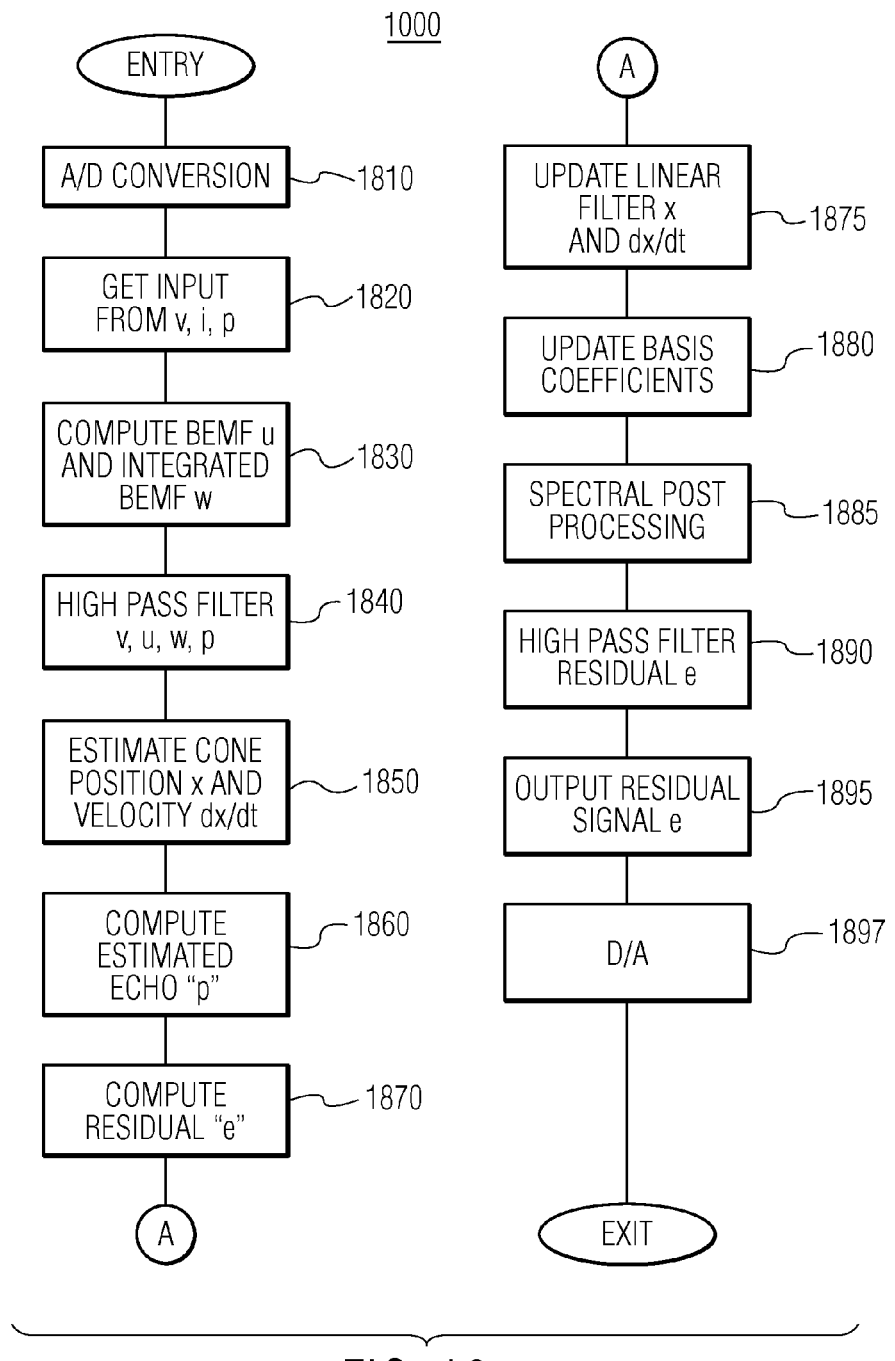
FIG. 18 illustrates an exemplary process for implementing the echo cancellation in accordance with the principles of the invention.

FIG. 18 illustrates an exemplary process 1800 for performing echo cancellation in accordance with the principles of the invention. In this exemplary process, the required input signals are converted to digital form, by analog-to-digital (N/D) converters in step 1810. In step 1820, the digital voltage (v), current (i), and pressure (p) data are read into the NL-AEC algorithm. At block 1830 the BEMF, u(t), and the integrated BEMF, w(t), are computed from v, i, and the known or adaptively estimated values of the loudspeaker coil's resistance and inductance (see equation 5.5 and the rightmost part equation 5.16, respectively). At block 1840, the values of v, u, w, and p are high pass filtered. This is a standard procedure in echo cancellation for blocking DC offsets, and is well known to those skilled in the art. At block 1850, an estimate of the cone position, x(t), is determined from equation 5.19 using the latest estimate of the function $\psi(w)$ with input w(t). For example, if $\psi(w)$ is parametrized in terms of monomials (basis function), then equation 5.24 is used with the latest estimate of the parameter vector $a=[a_0, \ldots, a_{Q-1}]$, i.e. the vector of basis coefficients of the monomial basis 1, w, $w^2, \ldots, w^{Q-1}$.

If the cone position is not used as an intermediate signal, but the velocity, $\dot{\chi}(t)$, (see FIG. 14) then the velocity is determined from equation 5.21 where $\psi'(w)$ is either derived from $\psi(w)$, or is parametrized separately, as for example in equation 5.26. At block 1860, the echo value is determined using equation 5.29. At block 1870 a residual error signal is determined (see leftmost side of equation 5.30). At block 1875 the linear filter from the cone position x(t) (and/or velocity if determined) to the microphone pressure p(t) is updated using equation 5.40 and at block 1880 the basis coefficients are updated according to equation 5.39.

In one possible implementation the basis coefficients parametrize the unknown function $\psi(w)$ or $\psi'(w)$, (for example, see equation 5.24). At block 1885, spectral post processing of the signals is performed. This step is also standard in acoustic echo cancellation and not presented in this invention. At block 1895 the residual, i.e. the cleaned microphone signal, is output. At block 1897 the residual signal e is converted back to an analog signal through a digital to analog process.

As would recognized, the function $\psi(w)$ i.e. the inverse of the force factor function, can be parametrized in any desirable and suitable way. Hence, it may be expanded in an arbitrary set of basis functions, which one can choose himself. Moreover, it is not necessary at all that the functions are expanded linearly in basis functions. It can be any nonlinear function of a set of parameters. However, the estimation of these parameters then also becomes nonlinear. The current document is very much biased toward expansion of $\psi(w)$ in basis functions. However, any general parametrization can be chosen. This can be done by using a general expression of $\psi(w)$ in terms of a set of unknown parameters instead of the specific choice in, for example, equation 5.24.

It would also be understood that when one chooses to use only the cone position as an intermediate signal (i.e. when one adopts the model in FIG. 9 as the basis of his algorithm), then the estimation of the velocity is not necessary.

Instead of using the cone position as an intermediate signal, it is also possible to use the cone velocity (in this case one adopts the model in FIG. 14 as the basis of his algorithm), or both the cone position and velocity. In this case you also need to estimate the cone velocity of course. This has consequences for block 1850 in the flow chart shown in FIG. 18. In the first case the position is estimated, whereas in the second the velocity is (also) estimated.

Once an estimate of the parameters is available, then the cone position estimate can be computed from the integrated BEMF. Subsequently this estimated position signal is used as an input to the identification/adaptation of the linear acoustic impulse response from a position to a microphone signal. In case a cone velocity is used as an intermediate signal, then this velocity is used as an input to the identification/adaptation of the linear acoustic impulse response from velocity to microphone signal. These two cases generalize directly to the case in which both the cone position and velocity are employed.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

REFERENCES

[1] A. Stenger and R. Rabenstein, "Adaptive Volterra Filters for Non-Linear Acoustic Echo Cancellation," in *Proc. NSIP*. Antalya (Turkey). June 1999.
[2] A. Stenger, L. Trautmann, and R. Rabenstein, "Nonlinear Acoustic Echo Cancellation with 2nd Order Adaptive Volterra Filters:" in *Proc. ICASSP*. Phoenix (USA), May 1999, vol. II, pp. 877-880.
[3] C. P. Janse, "Arrangement for Suppressing an Interfering Component of an Input Signal," U.S. Pat. No. 6,546,099, Apr. 8, 2003, Assignee: "Philips Electronics N.V.".
[4] C. P. Janse and P. A. A. Timmermans, "Acoustic Echo Cancellation: The application of a Dynamic Echo Suppressor," Technical Note 158197, Philips Research Laboratories, Eindhoven (The Netherlands), 1997.
[5] R. M. M. Derkx, H. J. W. Belt, and C. P. Janse, "Robust Adaptive Filters for Acoustic Echo Cancellation," Technical Note 2001/398, Philips Research Laboratories, Eindhoven (The Netherlands), December 2001.
[6] S. Haykin, *Adaptive Filter Theory*, Upper Saddle River (NJ, USA): Prentice-Hall, third edition, 1996. ISBN 0-13-322760-X,
[7] H. J. W Belt, C. P. Janse, and I. L. D. M. Merks, "Echo Canceller having Nonlinear Echo Suppressor for Harmonics Calculations," World Patent Application WO2003010950, Jun. 24, 2002 (priority date), Assignee: "Philips Electronics N.V".
[8] A. Stenger and W. Kellermann, "RLS-Adapted Polynomial for Nonlinear Acoustic Echo Cancelling," in *Proc. EUSIPCO*, Tampere (Finland). September 2000. pp. 1867-1870.
[9] A, Stenger and W, Kellermann, "Adaptation of a Memoryless Preprocessor for Nonlinear Acoustic Echo Cancelling," *Signal Processing*, vol. 80, pp. 1747-1760, 2000.
[10] A. Stenger, W. Kellermann, and R. Rabenstein, Adaptation of Acoustic Echo Cancellers Incorporating a Memoryless Nonlinearity," in *IEEE Workshop on Acoustic Echo and Noise Control (IWAENC)*, Pocono Manor, Pa., USA, September 1999.
[11] D. A. C. M. Roovers, A. Stenger, and I. L. D. M. Merks, "Preprocessor to improve performance of acoustic echo canceller for handsfree mobile phone," Invention Communication ID 612521, Philips Research Laboratories. Eindhoven (The Netherlands), December 2002.
[12] D. A. C. M. Roovers, A. Stenger, and I. L. D. M. Merks, "Loudspeaker-microphone system with echo cancellation system and method for echo cancellation," The Netherlands Patent Application PHNLO30 590 EPP, May 28, 2003 (priority date), Assignee: "Philips Electronics NY.".
[13] D. A. C. M. Roovers, "Modelling a clipping amplifier in acoustic echo cancellation," Technical Note 2005/00242, Philips Research Laboratories, Eindhoven (The Netherlands), March 2005.
[14] Andrew Bright, *Active control of loudspeakers: an investigation of practical applications*. Ph.D. thesis, Technical University of Denmark, 2002.
[15] L. Ngia and J. Sjoberg, "Nonlinear Acoustic Echo Cancellation Using a Hammerstein Model," *Proc. ICASSP*, Seattle (USA), May 1998, pp. 12 29-1232.

What is claimed is:

1. An apparatus for non-linear acoustic echo cancellation due to loudspeaker nonlinearities in a device having or used with an acoustic coil and including a microphone, the apparatus comprising:
a terminal configured and arranged to receive an electric signal representing for a coil at least one of a coil voltage and a current signal and estimates of a coil resistance and a coil inductance;
a signal processing logic circuit configured and arranged to:
determine a back EMF (BEMF) from the electrical signal
integrate the BEMF with respect to time;
estimate at least one of a cone position and a cone velocity based on the integrated BEMF;
determine an estimate of an acoustical impulse response from the estimated at least one of the cone position and the cone velocity to a microphone pressure;
determine an estimate of an echo value based on an estimated inverse of a force factor function primitive and the estimated acoustical impulse response; and
a second terminal configured and arranged to output the estimated echo value, the estimate providing a signal for echo cancellation in the device.

2. The apparatus of claim 1, wherein the force factor function is a function of a cone position.

3. The apparatus of claim 1 wherein the memory circuit including code, which when accessed by the processor circuit, further causes the processor to
high pass filter the BEMF and the integrated BEMF.

4. The apparatus of claim 1 wherein the memory circuit including code, which when accessed by the processor circuit, further causes the processor to
high pass filter the estimated echo value.

5. The apparatus of claim 1, wherein the force factor function is a function of a cone velocity.

6. A method for providing echo cancellation in a device having or used with an acoustic coil, the method comprising:
receiving at a terminal, an electrical signal representing for the coil at least one of a coil voltage and a current signal and estimates of a coil resistance and a coil inductance;
modeling the device using a Hammerstein model in a signal-processing logic circuit;
in the signal-processing logic circuit
determining a Back EMF based on the electrical signal;
estimating an inverse of a force factor function primitive and a linear filter based on the Hammerstein model, wherein the BEMF is an input value to the Hammerstein model and at least one of a cone position and a cone velocity of the loudspeaker is an intermediate value; and
determining an estimate of an echo value by computing the output of the series connection of the estimated inverse of the force factor function primitive and the estimated linear filter, the estimate providing a signal for echo cancellation in the device.

7. The method of claim 6 wherein the force factor function is a function of a cone position.

8. The method of claim 6, further comprising:
filtering the coil voltage and the current.

9. The method of claim 6, wherein the force factor function is a function of a cone velocity.

* * * * *